(12) United States Patent
Xu et al.

(10) Patent No.: US 10,826,945 B1
(45) Date of Patent: Nov. 3, 2020

(54) APPARATUSES, METHODS AND SYSTEMS OF NETWORK CONNECTIVITY MANAGEMENT FOR SECURE ACCESS

(71) Applicant: Syniverse Technologies, LLC, Tampa, FL (US)

(72) Inventors: Huiyue Xu, Tampa, FL (US); Deliang Qian, Tampa, FL (US); Sreenivasa Ganji, Tampa, FL (US)

(73) Assignee: Syniverse Technologies, LLC, Tampa, FL (US)

( * ) Notice: Subject to any disclaimer, the term of this patent is extended or adjusted under 35 U.S.C. 154(b) by 0 days.

(21) Appl. No.: 16/884,745

(22) Filed: May 27, 2020

Related U.S. Application Data

(60) Provisional application No. 62/866,836, filed on Jun. 26, 2019.

(51) Int. Cl.
*H04L 29/06* (2006.01)
*H04L 12/66* (2006.01)
(Continued)

(52) U.S. Cl.
CPC ............ *H04L 63/20* (2013.01); *H04L 9/0637* (2013.01); *H04L 12/66* (2013.01);
(Continued)

(58) Field of Classification Search
CPC . H04L 63/20; H04L 63/0263; H04L 63/0435; H04L 67/141; H04L 9/0637;
(Continued)

(56) References Cited

U.S. PATENT DOCUMENTS 6,308,267 B1  10/2001  Gremmelmaier
6,466,804 B1  10/2002  Pecen et al.
(Continued)

OTHER PUBLICATIONS

Tas, Mehmet. "Wi-Fi Alliance Hotspot 2.0 Specification Based Network Discovery, Selection, Authentication, Deployment and Functionality Tests." (2013). (Year: 2013).*
(Continued)

*Primary Examiner* — Syed A Zaidi
(74) *Attorney, Agent, or Firm* — Andriy Lytvyn; Smith & Hopen, P.A.

(57) ABSTRACT

The invention relates generally to the field of network connectivity management, specifically to provisioning and controlling the data access of multiple client devices to application servers via a connectivity management device. The invention includes apparatuses, methods, and systems for automating the management of such apparatus and its associating client devices. The management includes initializing and storing device data, ownership proof, connectivity credentials, and security policies into a management system, such as blockchain digital ledger or device management application server. The stored information is used for auto pairing and authenticating the devices via a second wireless technology and triggering secure connection setup over the first wireless technology. The method further includes changing the credential to establish data connection using the first wireless technology according to the device location and available data cost, detecting security attack events, and generating notifications for high data usage and attack detection results.

20 Claims, 15 Drawing Sheets

(51) Int. Cl.
*H04L 9/06* (2006.01)
*H04L 29/08* (2006.01)

(52) U.S. Cl.
CPC ...... *H04L 63/0263* (2013.01); *H04L 63/0435* (2013.01); *H04L 67/141* (2013.01); *H04L 2209/38* (2013.01); *H04L 2212/00* (2013.01)

(58) Field of Classification Search
CPC .. H04L 12/66; H04L 2212/00; H04L 2209/38
USPC .......................................................... 726/12
See application file for complete search history.

(56) References Cited

U.S. PATENT DOCUMENTS

| | | | |
|---|---|---|---|
| 6,978,157 | B1 | 12/2005 | Amiens |
| 7,065,340 | B1 | 6/2006 | Einola |
| 7,171,460 | B2 | 1/2007 | Kalavade et al. |
| 7,359,704 | B1 | 4/2008 | Dizdarevic et al. |
| 7,787,600 | B1 | 8/2010 | Bari |
| 9,001,693 | B2 * | 4/2015 | Abraham ............... H04W 84/12 370/254 |
| 10,045,216 | B1 * | 8/2018 | Indurkar ............... H04W 76/11 |
| 2002/0187777 | A1 | 12/2002 | Osterhout et al. |
| 2002/0191575 | A1 | 12/2002 | Kalavade et al. |
| 2003/0214958 | A1 | 11/2003 | Madour et al. |
| 2004/0005886 | A1 | 1/2004 | Oda et al. |
| 2004/0248547 | A1 | 12/2004 | Philsgard et al. |
| 2005/0114680 | A1 * | 5/2005 | Chinnaswamy ............................ H04W 12/04031 713/185 |
| 2005/0177733 | A1 | 8/2005 | Stadelmann et al. |
| 2005/0220139 | A1 | 10/2005 | Aholainen |
| 2005/0223111 | A1 * | 10/2005 | Bhandaru ............... H04L 63/164 709/236 |
| 2006/0251008 | A1 | 11/2006 | Wu et al. |
| 2007/0019580 | A1 | 1/2007 | Zhang et al. |
| 2007/0019623 | A1 | 1/2007 | Alt et al. |
| 2007/0109983 | A1 * | 5/2007 | Shankar ............... H04W 12/08 370/310.2 |
| 2007/0117577 | A1 | 5/2007 | Harris |
| 2007/0178885 | A1 | 8/2007 | Lev |
| 2007/0183363 | A1 | 8/2007 | Liden |
| 2007/0186106 | A1 | 8/2007 | Ting et al. |
| 2007/0208936 | A1 | 9/2007 | Ramos Robles |
| 2007/0254648 | A1 | 11/2007 | Zhang et al. |
| 2008/0077789 | A1 | 3/2008 | Gondo |
| 2008/0085707 | A1 | 4/2008 | Fadell |
| 2008/0232272 | A1 * | 9/2008 | Gelbman .......... H04L 29/12028 370/254 |
| 2008/0260149 | A1 | 10/2008 | Gehrmann |
| 2009/0059874 | A1 | 3/2009 | Carter |
| 2009/0086742 | A1 * | 4/2009 | Ghai ...................... H04W 36/14 370/401 |
| 2009/0094680 | A1 | 4/2009 | Gupta et al. |
| 2009/0205028 | A1 | 8/2009 | Smeets et al. |
| 2009/0221265 | A1 | 9/2009 | Liu et al. |
| 2010/0146262 | A1 | 6/2010 | Zhang |
| 2010/0232407 | A1 | 9/2010 | Navali et al. |
| 2010/0263022 | A1 | 10/2010 | Wynn et al. |
| 2010/0311404 | A1 | 12/2010 | Shi et al. |
| 2011/0007159 | A1 * | 1/2011 | Camp ................... H04N 21/23 348/143 |
| 2011/0007705 | A1 | 1/2011 | Buddhikot et al. |
| 2011/0041167 | A1 | 2/2011 | Nguyen |
| 2011/0047603 | A1 | 2/2011 | Gordon et al. |
| 2011/0154454 | A1 | 6/2011 | Frelechoux |
| 2011/0165896 | A1 | 7/2011 | Stromberg et al. |
| 2011/0269456 | A1 | 11/2011 | Krishnaswamy et al. |
| 2011/0271331 | A1 | 11/2011 | Adams |
| 2011/0277019 | A1 | 11/2011 | Pritchard, Jr. |
| 2012/0149334 | A1 | 6/2012 | Zhang |
| 2013/0024921 | A1 * | 1/2013 | Gupta ................... H04L 41/0806 726/6 |
| 2013/0171982 | A1 * | 7/2013 | Barritt ................... H04W 12/02 455/422.1 |
| 2014/0010222 | A1 * | 1/2014 | Chen ..................... H04W 4/50 370/338 |
| 2014/0293829 | A1 * | 10/2014 | Visuri ................... H04M 15/8351 370/254 |
| 2016/0095153 | A1 * | 3/2016 | Chechani ............. H04W 76/12 370/338 |
| 2018/0304857 | A1 * | 10/2018 | Peeters ................. H04L 9/3066 |

OTHER PUBLICATIONS

NPL Search Terms (Year: 2020).*
Bendor, OutSmart, North America, "FMC: A Driving Trend," Pipeline, vol. 2, Issue 1, Jun. 2005, Pipeline Publishing LLC, pp. 1-2.
Mobilelgnite, "Voice Call Handover Service: Functional Specification," Version 1.0, Sep. 21, 2006, Interoperability Group "Best Practices," pp. 1-52.
Mobilelgnite Program-FAQ, "Mobileignite Adds Eight New Members," www.mobileignite.org/news/pr_012506.html, pp. 1-2, accessed Dec. 20, 2007.
Congdon et al., "IEEE 802.1X Remote Authentication Dial in User Service (RADIUS) Usage Guidelines," Network Norking Group, Request for Comments: 3580, Sep. 2003, http://www.ietf.org/rfc/rfc3580.txt, pp. 1-30.
Haverinen et al., "Extensible Authentication Protocol Method for Global System for Mobile Communications (GSM) Subscriber Identity Modules (EAP-SIM)," Network Working Group, Request for Comments: 4186, Jan. 2006, http://www.ietf.org/rfc/rfc4186.txt, pp. 1-92.
Arkko et al., "Extensible Authentication Protocol Method for 3rd Generation Authentication and Key Agreement (EAP-AKA)," Network Working Group, Request for Comments: 4187, Jan. 2006, http://www.ietf.org/rfc/rfc4187.txt, pp. 1-79.
Anton et al., Best Current Practices for Wireless Internet Service Provider (WISP) Roaming. Wi-Fi Alliance-Wireless ISP Roaming (WISPr) Version: 1.0, Feb. 2003, pp. 1-37.
Wireless Broadband Alliance, "WISPr 2.0," Doc Ref. No. WBA/RM/WISPr Version 01.00, Apr. 8, 2010, pp. 1-58.
Wireless Broadband Alliance, "EAP over WISPr 2.0 Trial," Jun. 9, 2010, pp. 1-22.
3GPP Organizational Partners (ARIB, ATIS, CCSA, ETSI, TTA, TTC), "3rd Generation Partnership Project; Technical Specification Group Core Network and Terminals; Mobile Application Part (MAP) specification (Release 9)," 3GPP TS 29.002, V9.1.0, Mar. 2010, pp. 1-923.
European Telecommunications Standards Institute, "Digital cellular telecommunications system (Phase 2+); Specification of the Subscriber Identity Module-Mobile Equipment (SIM-ME) interface; (GSM 11.11)," GSM Technical Specification, Jul. 1996, Version 5.3.0, pp. 1-113.
"The implementa Virtual SIM System for Carrier Class GSM Gateways," http://www.implementa.com, unnumbered pp. 1-30.
Kasper et al., "Subscriber Authentication in Cellular Networks with Trusted Virtual SIMS," 10th International Conference on Advanced Communication Technology, ICACT 2008, vol. 2, Gangwon-Do, Feb. 17-20, 2008, pp. 903-908.
European Telecommunications Standards Institute, "Digital cellular telecommunications system (Phase 2); Mobile Application Part (MAP) specification (GSM 09.02)," European Telecommunications Standard, ETS 300 599, Jan. 1997, 4th ed., pp. 1-400.
European Telecommunications Standards Institute, "Digital cellular telecommunications system (Phase 2); Mobile Application Part (MAP) specification (GSM 09.02)," European Telecommunications Standard, ETS 300 599, Jan. 1997, 4th ed., pp. 401-781.

* cited by examiner

APPARATUSES, METHODS AND SYSTEMS OF NETWORK CONNECTIVITY MANAGEMENT FOR SECURE ACCESS

PRIORITY CLAIM

This non-provisional application claims priority to U.S. provisional application having Ser. No. 62/866,836 filed on Jun. 26, 2019.

BACKGROUND OF THE INVENTION

1. Field of the Invention

This invention relates generally to the field of network connectivity management, specifically to provisioning and controlling the data access of multiple client devices to application servers via a connectivity management device.

2. Brief Description of the Related Art

Remote employment, working from home, and working remotely while travelling have become a way of life for many employees. Enterprise employees use laptops, mobile phones, tablets, and other electronic devices for work-related tasks and often need to access the enterprise network for related systems, applications and/or data remotely. For example, an employee may need to access data from home during afterhours, while working remotely, or from a hotel while travelling. When working remotely, employees often connect their laptops or tablets to unsecured or uncertified public Wi-Fi networks, which entails major risks to the data security and device security. Also, employees often connect their laptops to their mobile phones through data tethering, which may result in high data expense to the enterprise, especially when the employees travel aboard where data roaming cost is high.

Currently, there are several mobile hotspot devices—for example, those sold under trademarks MiFi® or Jetpack®. Mobile hotspot devices can be used to connect various Wi-Fi enabled client devices—such as mobile phones, laptops, etc.—to the public Internet through cellular networks. Such hotspot devices are generally equipped with data subscriber identification module (SIM) from one or more cellular network providers enabling the hotspot device to connect to their networks.

However, currently known hotspot devices are not equipped with sufficient capabilities to be used by enterprise customers. For example, hotspot devices lack the interface with enterprise's client device management system for remote management and cannot auto associate and connect with client devices. Furthermore, hotspot devices lack security mechanisms necessary to enforce the credential checking and application data inspection, which may result in misuse of the hotspot devices and create security risks for the corporate networks. Moreover, the corporate device management systems also lack the capabilities to manage mobile hotspot devices because the device management system does not interface with mobile operator to get the data usage, dynamic network selection and real-time data control.

Internet of Things (IoT) devices are also used in various areas with explosive growth. During the recent years, countless IoT devices have become widely adopted, including personal smart watches, fitness rings, home automation devices, industrial IoT devices, smart cities, stationary smart meters, always connected cards, etc. Many IoT devices require connecting with each other through public Internet or via private networks. However, it is not cost effective to embed the latest security hardware and software inside each IoT device. There is a variety of technologies and networks for interconnecting IoT devices, including wireline, Wi-Fi, Zigbee, LoRa, and Bluetooth. Security management of these different networks presents yet another challenge, creating a need for an IoT Gateway or Edge Gateway to connect with the IoT devices to collect the data in one form via one connection technology and send the data to the remote cloud server in another form via a different connection technology. The connectivity management requires uniform solutions to manage the provision and security of the IoT devices while hiding the differences underlying each device. Furthermore, there is a need to reduce barriers of implementing IoT devices in different fields and different scales while still maintaining security and flexibility.

The growing use of laptops and client devices to access corporate data poses greater security threat for information technology (IT) departments. There is a large variety of client devices and security compliance requirements. The client devices often become attack targets. Furthermore, data roaming usage may be expensive for roaming client devices.

The market problem associated with the use of client device has multiple layers. For corporate enterprises, the problem is associated with inconsistent access policy and complexity in policy management. For small and medium-sized enterprises (SMEs), the problem is associated with their inability to keep the IT system and IT members always equipped with the latest security practice. Client devices are often exposed to threats when accessing a public Wi-Fi network. Furthermore, for the end user, there is a problem associated with an inconsistent user experience when working remotely or via a mobile device, especially when remote connection is via a virtual private network (VPN). VPN connections are notorious for involving cumbersome processes that require the user to manually key in the credentials every time.

SUMMARY OF THE INVENTION

In an embodiment, the invention pertains to a method of establishing a wireless data connection between a client device and a target server. The method involves a step of establishing a network connection between a connection management device (CMD) and a management system. In an embodiment, this network connection may be established over a mobile network. After the network connection between the CMD and the management system is established, the CMD is registered as a record into the management system.

The method further involves a step of connecting the client device to the management system. After a network connection between the client device and the management system is established, the management system can retrieve a unique identifier associated with the client device. After both the client device and the CMD are registered with the management system, a rule associating the client device with the CMD can be established.

In an embodiment, the management system generates a first connectivity credential and the second connectivity credential. The first connectivity credential is provisioned to the CMD, while the second connectivity credential is provisioned to the client device. Access information for establishing a connection with the CMD is also provisioned to the client device.

Next, the client device transmits a pairing request to the CMD based on the access information the client device received from the management system. The CMD authenticates the client device by exchanging authentication challenges based on the first connectivity credential and the second connectivity credential. If the CMD successfully authenticates the client device, a network connection between the client device and the CMD is established over a first wireless technology using a first transceiver housed within the CMD. The first wireless network technology can be a Wireless Fidelity (Wi-Fi), a Zigbee, a Long Range (LoRa), a Bluetooth technology, etc.

The CMD also establishes a network connection to the target server over a second wireless technology. In an embodiment, the second wireless technology is a mobile network connection established using a second transceiver housed within the CMD. Examples of mobile networks include a Global System for Mobile Communications (GSM) network, a Universal Mobile Telecommunications Service (UMTS) network, a Long-Term Evolution (LTE) network, a 5$^{th}$ Generation (5G) network, or another type of mobile network.

In the manner described above, a wireless data connection is established between the client device and the target server via the CMD. This wireless data connection enabled data packets to be transferred between the client device and the CMD via the first wireless technology connection and transferred between the CMD and the target server via the mobile network connection. The mobile network connection can be established based on an international mobile subscriber identity (IMSI) incorporated into a subscriber identification module (SIM) card, a USIM card, an Embedded Universal Integrated Circuit Card (eUICC) card, or a virtual SIM card associated with the CMD.

In an embodiment, the first connectivity credential provisioned by the management system to the CMD is encrypted and is configured to be decrypted with a private key associated with the CMD. The first connectivity credential can include an identifier, an authentication type, an authentication credential, and/or a public key of the client device.

In an embodiment, the second connectivity credential provisioned by the management system to the client device is encrypted and is configured to be decrypted with a private key associated with the client device. The second connectivity credential can include an identifier, a radio beacon type, an authentication type, an authentication credential, and/or a public key of the CMD In an embodiment, the mobile network connection between the CMD and the target server involves setting up data connection between the CMD and a security gateway. The CMD can be configured to encapsulate the data packets received from the client device based on a protocol specified by the security gateway, prior to transmitting encapsulated data packets to the security gateway. The CMD can also be configured to decapsulate the data packets received from the security gateway and to relay decapsulated data packets to the client device.

In an embodiment, the management system can be a blockchain digital ledger network or a device management system reachable via public Internet or private connections.

BRIEF DESCRIPTION OF THE DRAWINGS

For a fuller understanding of the invention, reference should be made to the following detailed disclosure, taken in connection with the accompanying drawings, in which.

DETAILED DESCRIPTION OF THE PREFERRED EMBODIMENT

Embodiments of the present invention include apparatuses, methods, and systems for enhancing network connectivity management to achieve secure data access and to automate device management and monitoring with real-time data analytics. In an embodiment, the invention includes a Connectivity Management Device (CMD) 12, which schematically depicted in FIG. 1.

Figure 1A:
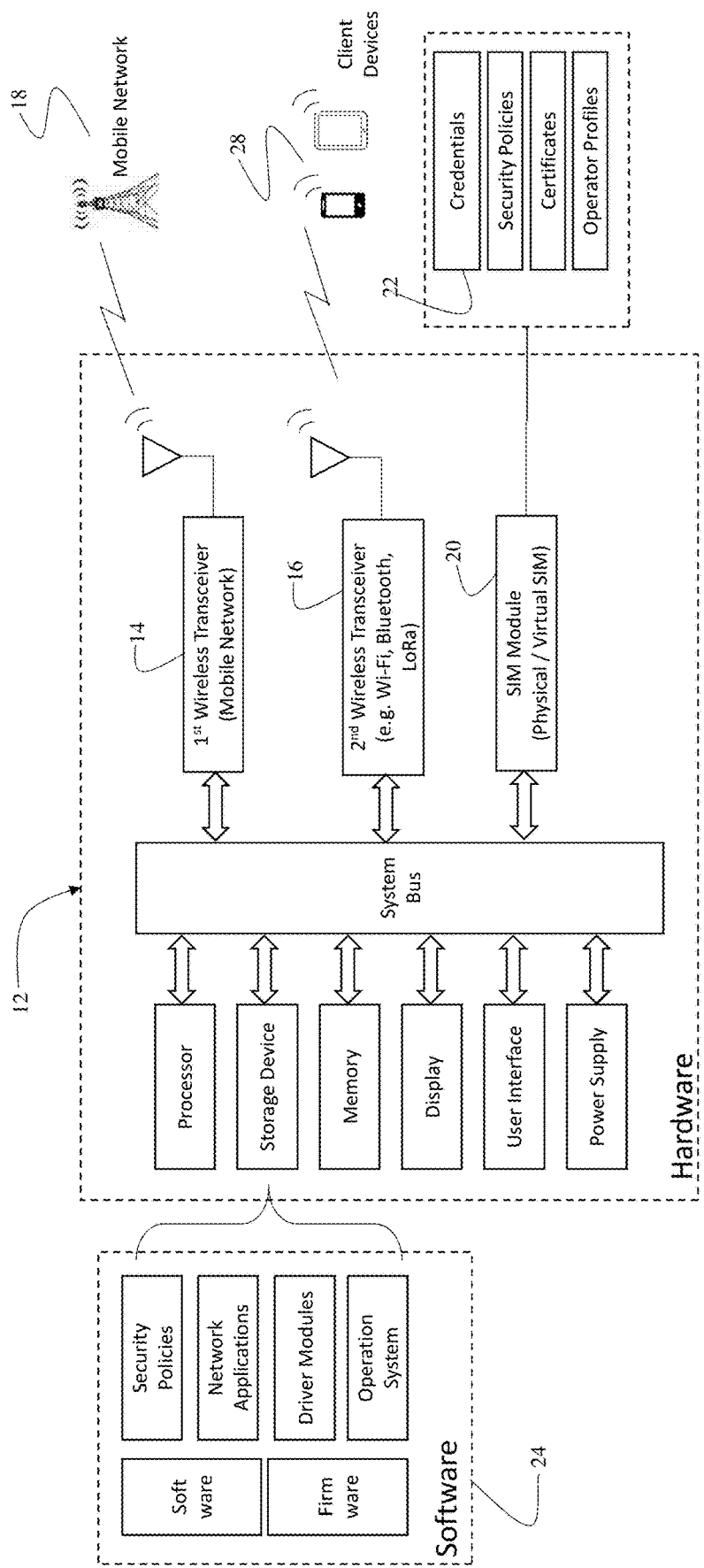
FIG. 1A is a block diagram schematically depicting an embodiment of a Connectivity Management Device (CMD).
Figure 1B:
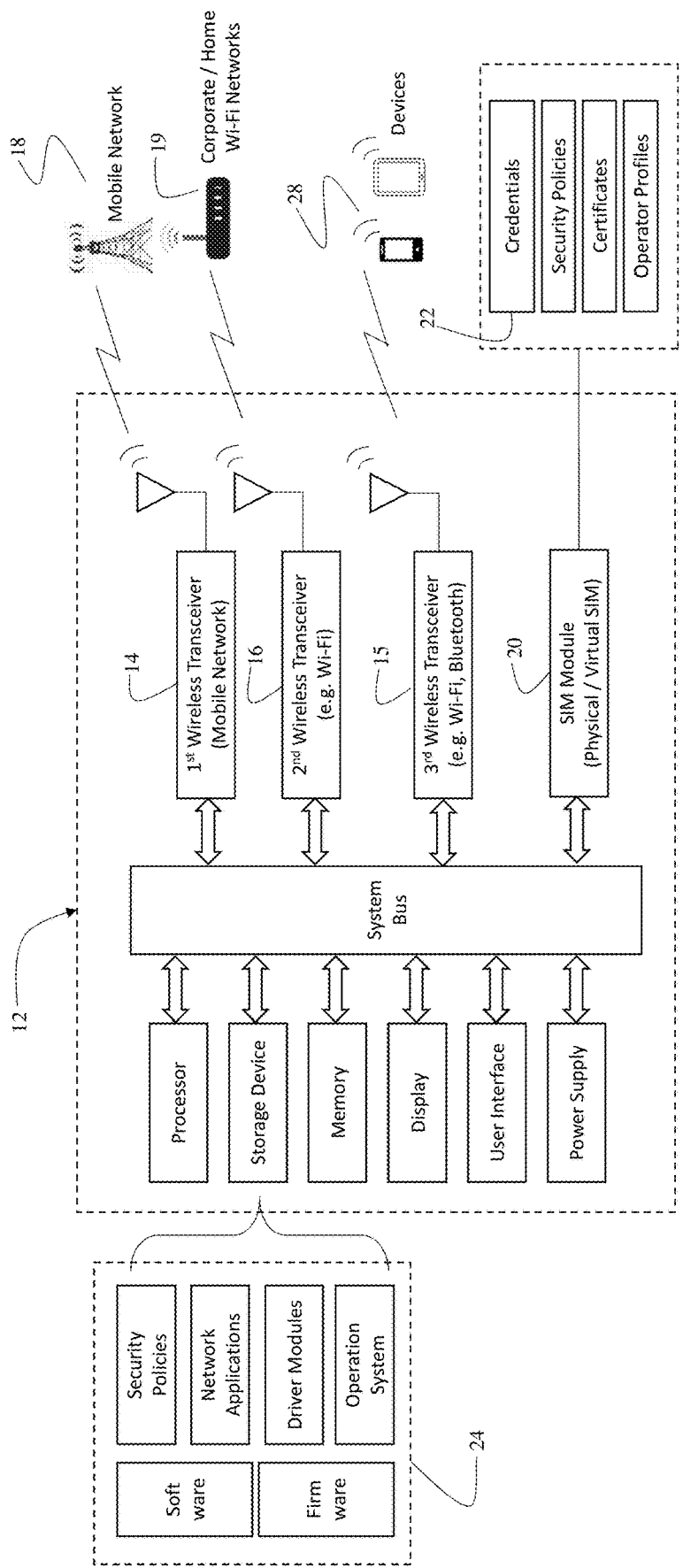
FIG. 1B is a block diagram schematically depicting an embodiment of the CMD having a dedicated transceiver for a connection with corporate/home Wi-Fi network.

As depicted in FIGS. 1A-B, CMD 12 includes at least two wireless transceivers. A first wireless transceiver 14 is used to establish a network connection to a first wireless network—for example, mobile network 18. A second wireless transceiver 16 is used to establish a network connection with to a client device 28 via a second wireless network—for example, Wi-Fi, Bluetooth, LoRa, etc. CMD 12 further includes at least one physical or virtual Subscriber Identification Module (SIM) 20 to store credentials 22 provided by network providers with first wireless technology 14. Credentials 22 are used to authenticate, validate, and claim the ownership of CMD 12. SIM 20 is further configured to store tamper-proof connectivity certificate that can be retrieved by firmware and/or software.

In the embodiment depicted in FIG. 1B, CMD 12 includes a wireless transmitter 15. Wireless transmitter 15 can be configured to connect to a corporate or home Wi-Fi network 19. This embodiment differs from embodiment in FIG. 1A because the connection between CMD 12 and the Internet can be established via Wi-Fi network 19, instead of mobile network 18. In this embodiment, CMD 12 can be configured to provide a layer of security and management control between an end user's client device 28 and the Internet, even when CMD 12 is connected to a home/public Wi-Fi network 19.

Figure 2:
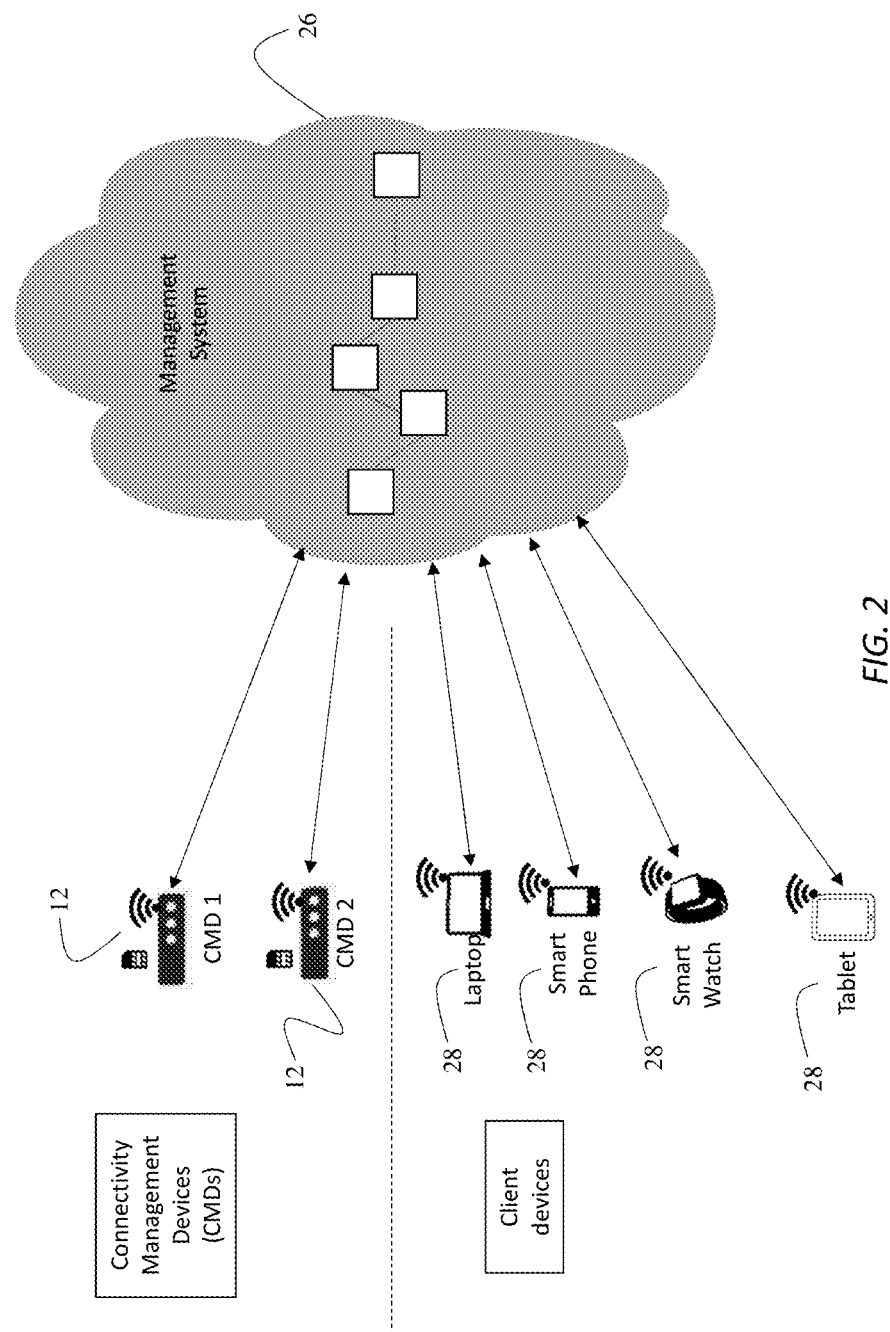
FIG. 2 is a schematic diagram depicting network connections between the CMDs and the management system and network connections between the client devices and the management system during the initialization and registration stages.

FIGS. 1A-B further depict that CMD 12 includes a software module 24. Software module 24 enables CMD 12 to establish a network connection to a management system 26, as depicted in FIG. 2. In an embodiment, the management system 26 is a blockchain digital ledger or a device management application server on the public Internet.

FIG. 2 depicts an embodiment in which one or more CMDs 12 establish a network connection to management system 26 to register each CMD 12 with management system 26. FIG. 2 further depicts a plurality of client devices 28 establishing network connections with management system 26 to register therewith. Both CMD 12 and client device 28 must first register with management system 26 before CMD 12 and client device 28 can establish network connections with one another.

Figure 3:
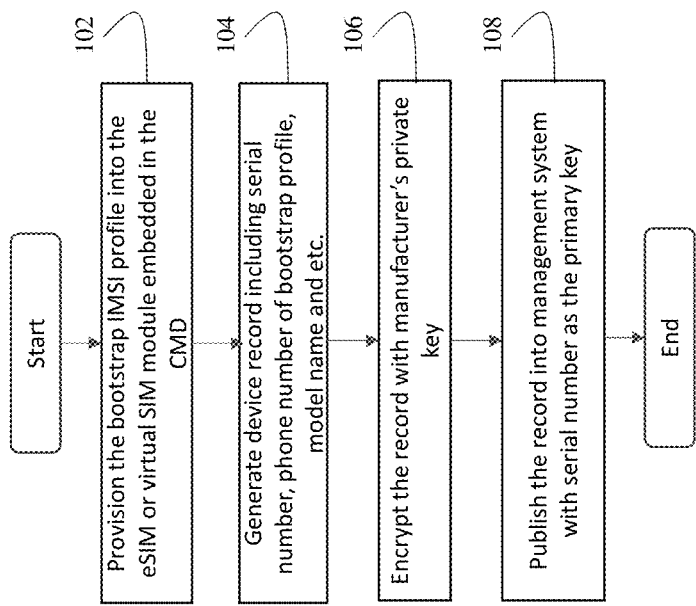
FIG. 3 is a flowchart depicting the steps of the CMD manufacturer initialization stage.
Figure 4:
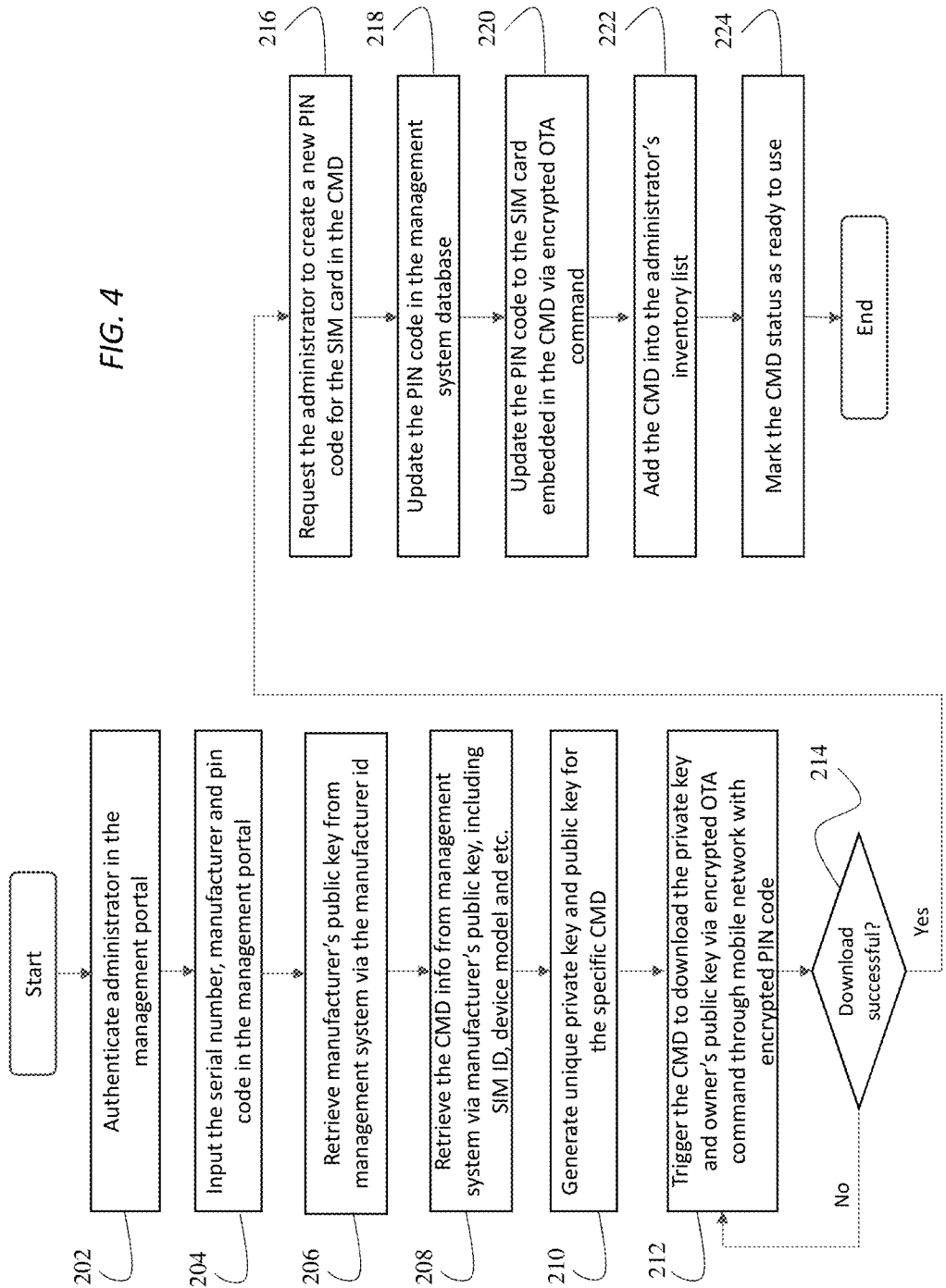
FIG. 4 is a flowchart depicting the steps of associating the CMD with an enterprise administrator and registering the CMD into the management system.
Figure 5:
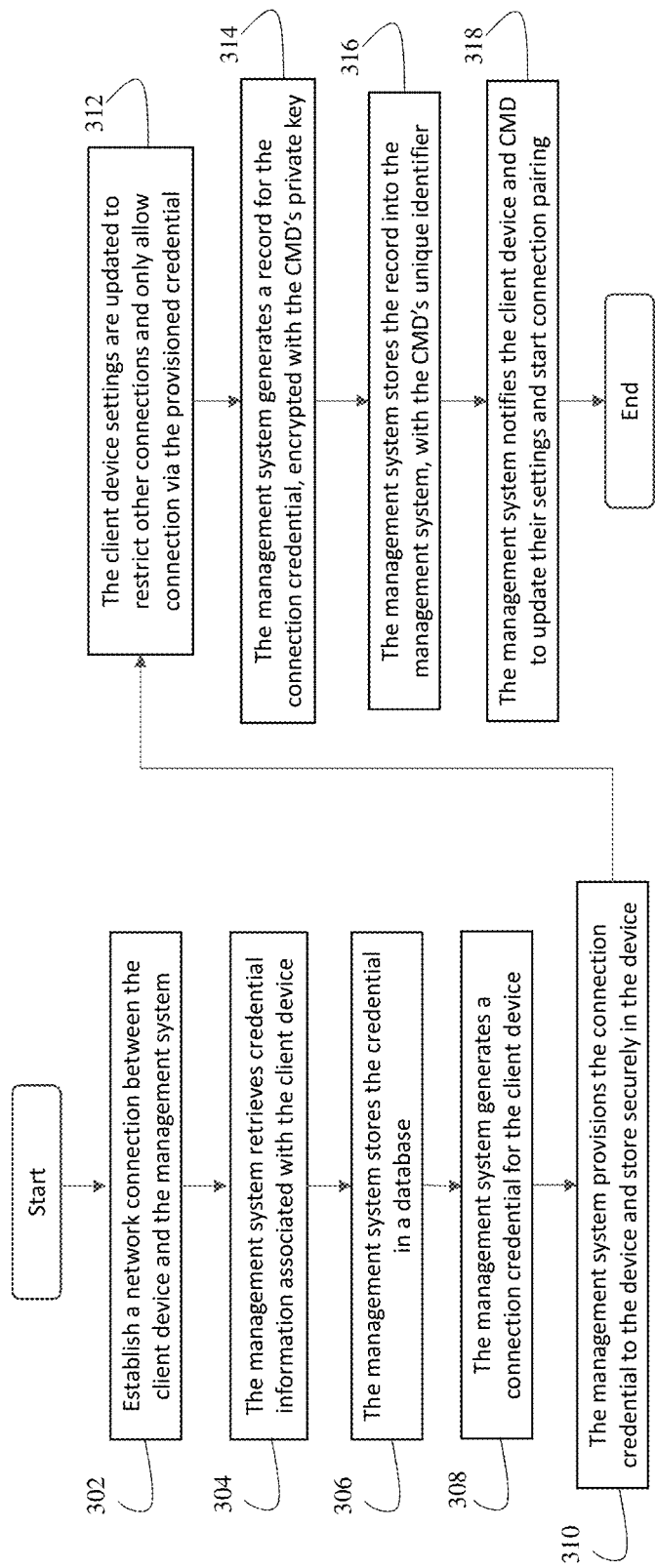
FIG. 5 is a flowchart depicting the process of associating a client device with the CMD.

FIGS. 3 and 4 depict the steps of registering CMD 12 with management system 26, while FIG. 5 depicts the steps of registering client device 28 with management system 26. Each of these aspects of the invention are discussed in more detail below.

CMD Registration

FIG. 3 depicts the steps of the manufacturer initialization stage for CMD 12. In step 102, a bootstrap IMSI profile is provisioned into SIM module 20 embedded in CMD 12. In step 104, a device record for CMD 12 is generated. The device record can include the serial number of CMD 12, phone number of the bootstrap profile, model name of CMD 12, etc. In step 106, the generated device record is encrypted with manufacturer's private key. In step 108, the encrypted device record is published into management system 26. The encrypted device record may be referenced using a unique hash key value associated with CMD 12. Management system 26 can be configured to store manufacturer's public key and associate the stored manufacturer's public key with the manufacturer's identification. Serial number of CMD 12 may be used as a primary key.

FIG. 4 depicts the steps of the method of CMD 12 provisioning procedure. In step 202, an administrator authenticates into a management portal that interfaces with management system 26. In step 204, the administrator inputs identification information associated with CMD 12—for example, manufacturer's identification and a personal identification number (PIN). In step 206, the administrator retrieves the manufacturer's public key from management system 26 based on the inputted manufacturer's identification. In step 208, the administrator retrieves the encrypted device record associated with CMD 12 from management system 26. The device record can be decrypted using the manufacturer's public key.

Next, in step 210, unique private key and public key for CMD 12 are generated. In step 212, CMD 12 is triggered to download the generated private and public keys. In an embodiment, the private and public keys can be downloaded via an encrypted over-the-air (OTA) command through a mobile network 18 with an encrypted PIN code. If, in step 214, it is determined that CMD 12 has successfully downloaded the private and public keys, the method proceeds to step 216. In step 216, the administrator creates a new PIN code for SIM module 20 of CMD 12. In step 218, the PIN code is updated in the database of management system 26.

In step 220, the PIN code is updated in SIM module 20 of CMD 12—for example, via an encrypted OTA command. In step 222, CMD 12 is added to the administrator's inventory list. Finally, in step 224, CMD 12 becomes ready for use.

Client Device Registration

As depicted in FIG. 2, both CMD 12 and client device 28 need to be registered with the management system 26 prior to client device 28 being able to connect to CMD 12. An exemplary method of registering client device 28 with management system 26 is depicted in FIG. 5. FIG. 5 depicts that, in step 302, client device 28 establishes a network connection to management system 26. In step 304 management system 26 retrieves credential information from client device 28 by interfacing with an application running on client device 28. In step 306, management system 26 stores the credential information in the database. The credential information may be encrypted with a private key of client device 28 and may be referenced via unique hash value associated with client device 28.

In step 308, management system 26 generates a connectivity credential for client device 28. In step 310, management system 26 provisions the connectivity credential to client device 28. In an embodiment, client device 28 may be managed via Mobile Device Management (MDM) system (not shown). MDM may be implemented using a server component configured to send out management commands and a client component, which is deployed on client device 28 and is configured to receive and implement the commands. In this embodiment, management system 26 triggers MDM to provision the connectivity credential to client device 28.

In step 312, client device 28 may be directed to update its settings to only allow connection via the provisioned connectivity credential, restricting all other connections. In step 314, management system 26 can be configured to generate a record for the connectivity credential. The generated record can be encrypted, for example using the private key of CMD 12. In step 316, the record can be stored in management system 26 with the unique identifier of CMD 12. In step 318, management system 26 can be configured to notify CMD 12 and client device 28 to update their setting and start connection pairing.

Pairing Client Device and CMD

Figure 6:
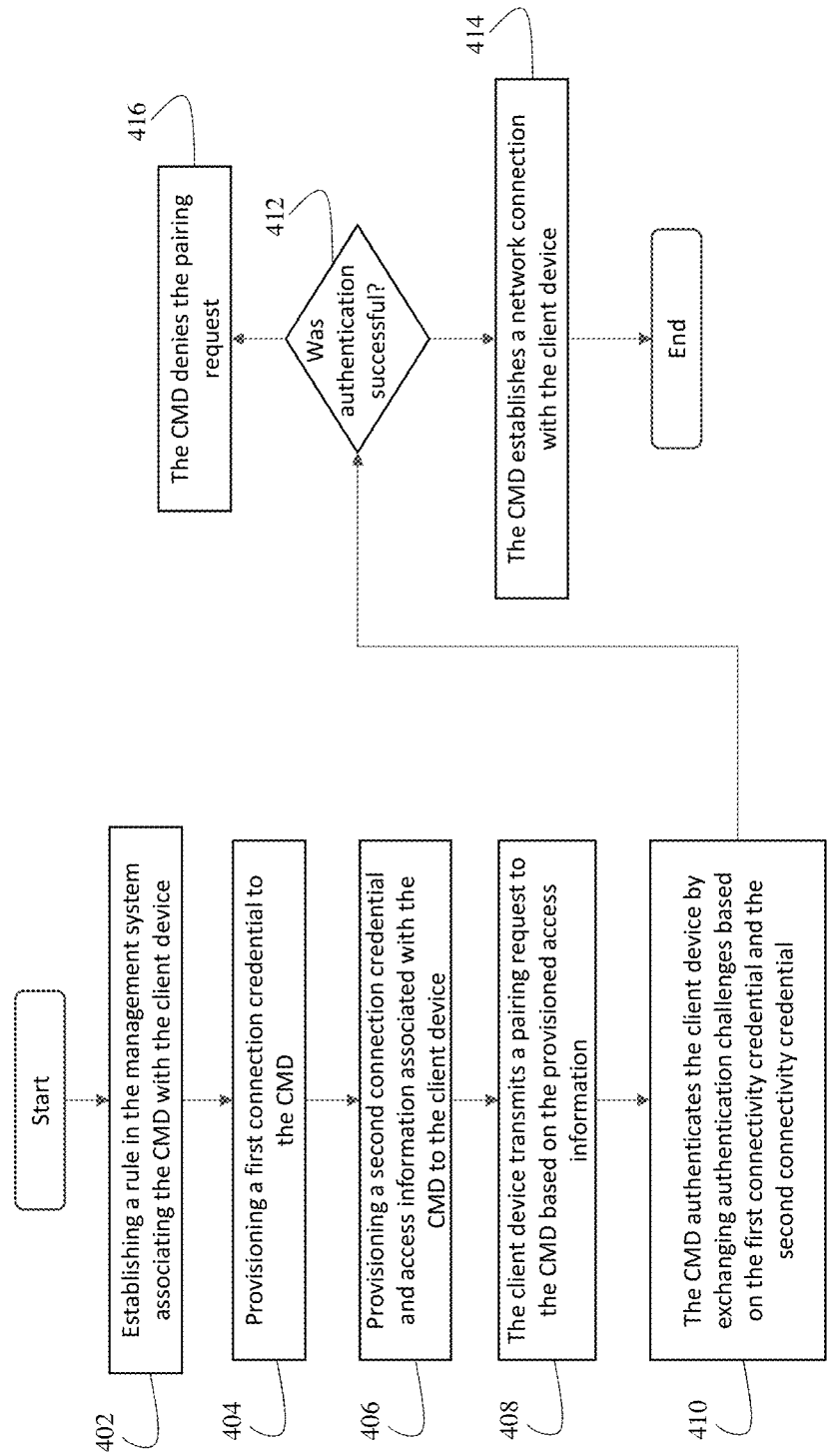
FIG. 6 is a flowchart depicting the process of establishing a network connection between the CMD and the client device.

FIG. 6 depicts the steps for connecting CMD 12 with client device 28. After both client device 28 and CMD 12 register with management system 26, credential information for mobile device 28 and access information for CMD 12 are stored in management system 26. In step 402, the administrator can establish a rule associating client device 28 with CMD 12. In step 404, management system 26 provisions a first credential to CMD 12. In step 406, management system 26 provisions a second connectivity credential and CMD 12 access information to client device 28. CMD 12 and client device 28 can decrypt the received credentials using their respective private keys. As a result of these steps, CMD 12 and client device 28 have identification information for one another that enables client device 28 to connect to CMD 12.

In step 408, using CMD 12 access information, client device 28 sends a pairing request to CMD 12. In step 410, CMD 12 authenticates client device 28 by exchanging authentication challenges based on the connectivity credentials CMD 12 and client device 28 received from management system 26. In step 412, CMD 12 determines whether the authentication was successful. If so, CMD 12 establishes a connection with client device 28 in step 414. Otherwise, CMD 12 denies the pairing request in step 416.

Figure 7:
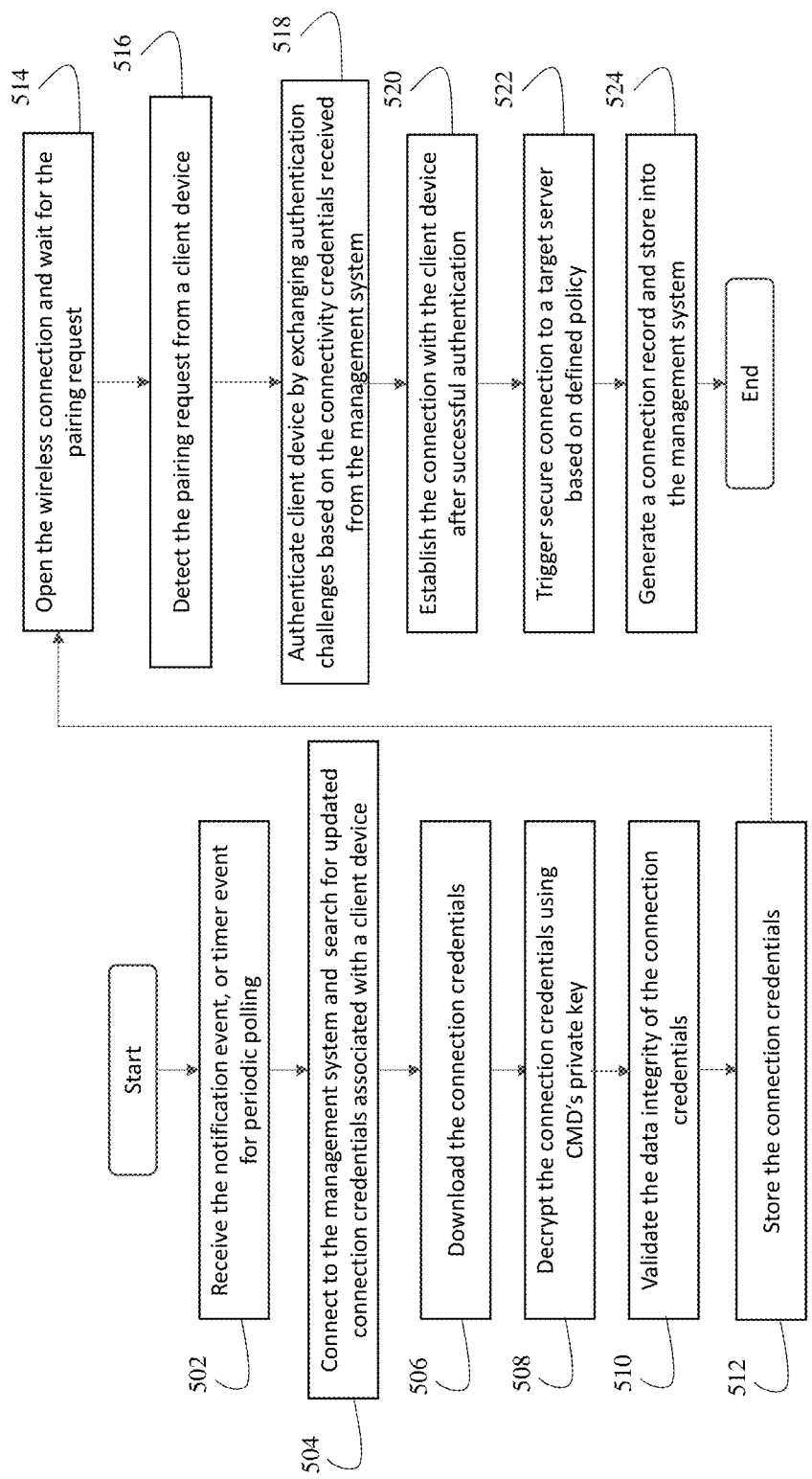
FIG. 7 is a flowchart depicting the process of establishing a wireless network connection between a client device and a target server via network connections with the CMD.

FIG. 7 depicts the steps executed by CMD 12 during the pairing procedure. In step 502, CMD 12 receives a notification or uses a timer for periodic polling. In step 504, responsive to the notification event or expiration of the timer, CMD 12 connects to management system 26 and searches management system 26 for updated connectivity credentials associated with client device 28. In step 506, CMD 12 downloads the connectivity credential associated with client device 28.

As disclosed above, in an embodiment, the connectivity credentials may be encrypted. In step 508, CMD 12 is configured to decrypt the connectivity credentials received from management system 26 using the private key associated with CMD 12. In step 510, CMD 12 validates the data integrity of the connectivity credentials. In step 512, CMD 12 securely stores the connectivity credentials.

In step 514, CMD 12 opens a wireless connection and waits for a pairing request from client device 28. The pairing request received from client device 28 carries a connectivity credential from client device 28. In step 516, CMD 12 detects a pairing request from client device 28. In step 518, CMD 12 authenticates client device 28 by exchanging authentication challenges based on the connectivity credentials CMD 12 and client device 28 received from management system 26. In step 520, if the credentials match, CMD 12 determines that client device 28 is indeed authorized to pair with CMD 12 and establishes a connection with client device 28.

Next, in step 522, CMD 12 triggers a secure connection to a target server (for example, an application server) based on a predefined policy. In step 524, CMD 12 may be configured to generate the connection record and store the connection record into management system 26.

In an embodiment, management system 26 is configured to automate management of CMD 12 and client devices 28, thereby eliminating a need for user to login directly into CMD 12 or client device 28 for configuration and data provision.

Figure 8:
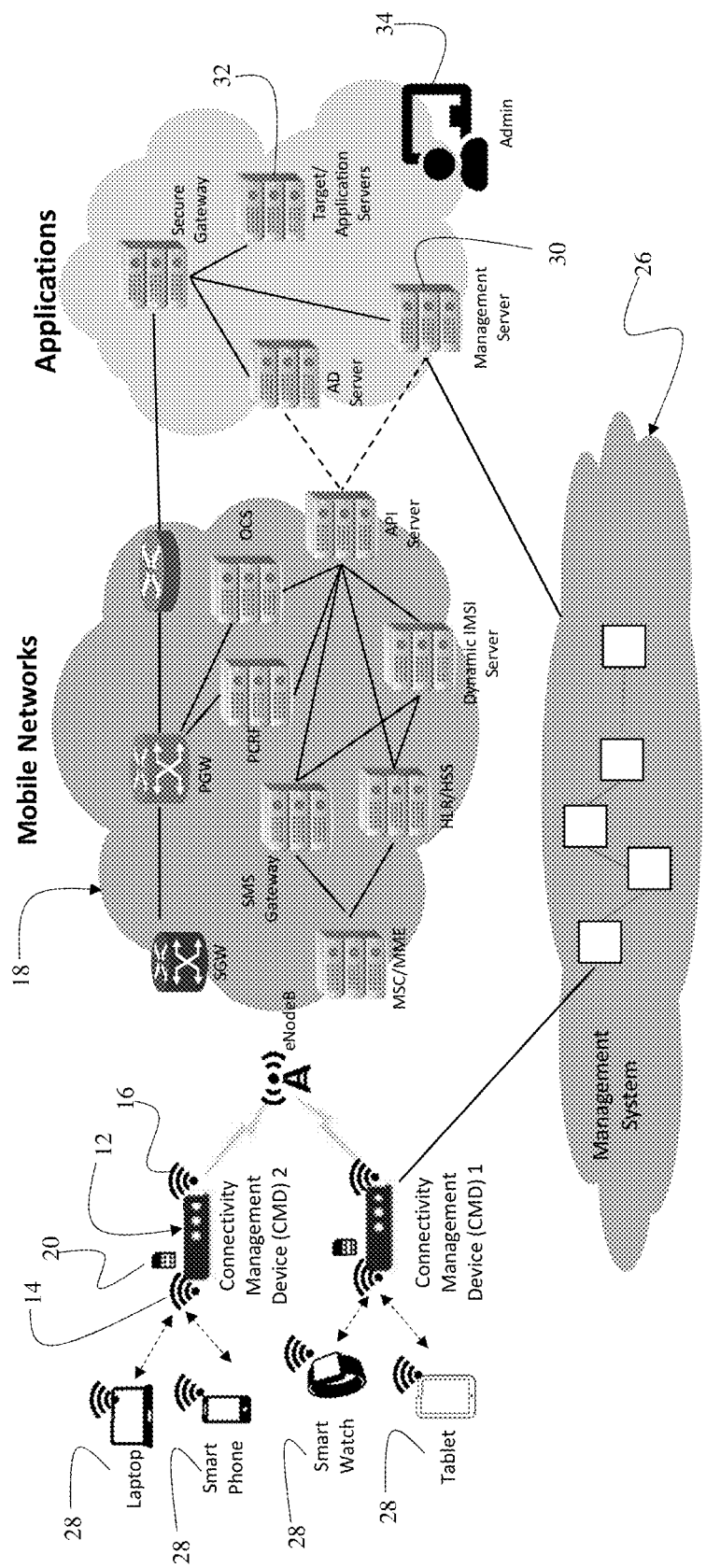
FIG. 8 is a schematic diagram depicting architecture of an embodiment of the invention in a non-roaming scenario.
Figure 9:
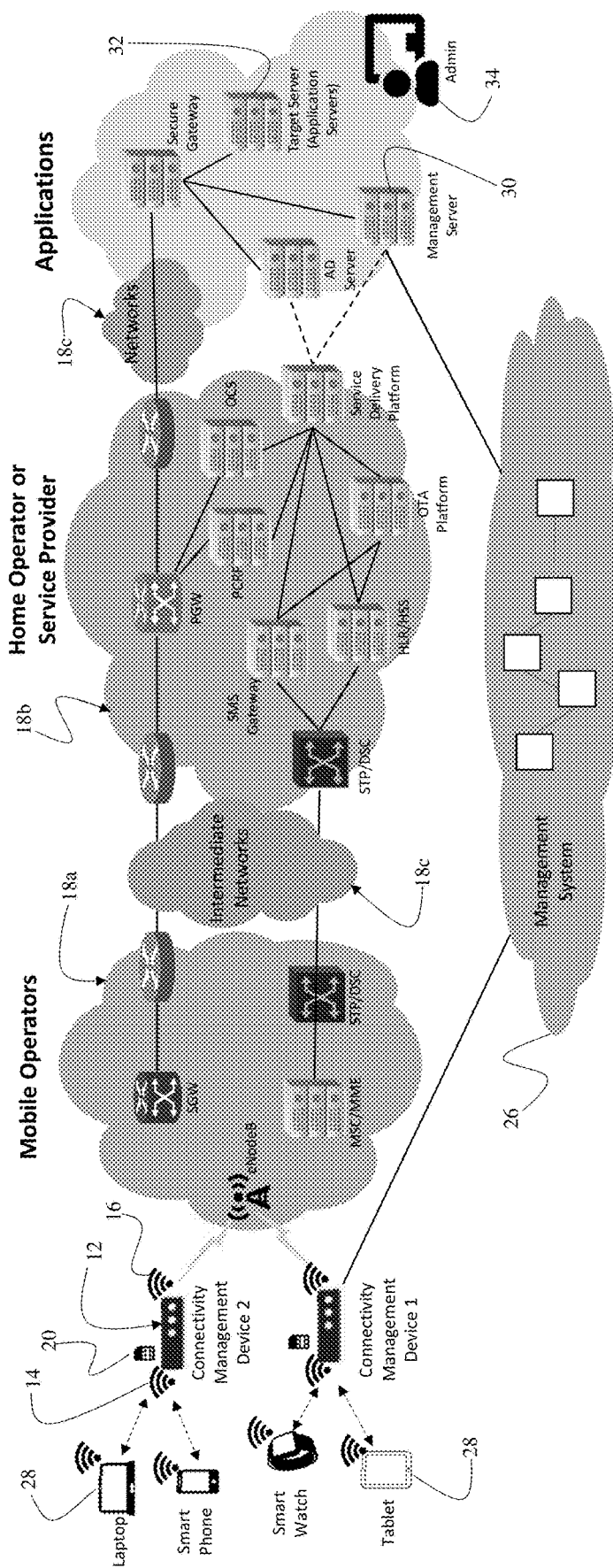
FIG. 9 is a schematic diagram depicting architecture of an embodiment of the invention involving intermediate networks in a roaming scenario.

FIGS. 8 and 9 depict architecture of two exemplary deployments of an embodiment of the invention. FIG. 8 pertains to a non-roaming scenario, while FIG. 9 pertains to a roaming scenario involving one or more intermediate networks 18c. Intermediate networks 18c are configured to interconnect mobile operator 18a and home operator/server provider 18b. FIGS. 8 and 9 pertain to functionality of the invention after each client device 28 is successfully connected to one of CMDs 12.

FIGS. 8 and 9 depict CMD 12 having first transceiver 14 and second transceiver 16. CMD 12 has a network connection to client device 28 via first transceiver 14. This network connection enables data transfer between client device 28 and CMD 12. CMD 12 also has SIM/eSIM module 20 for establishing a network connection to mobile network 18. Network connection between CMD 12 and mobile network 18 is established using second transceiver 16. Mobile network 16 enables data transfer between CMD 12 and a target server 32—for example, an application server. In this configuration, client devices 28 exchange data with their designated CMDs 12, and CMDs 12 exchange data with target server 32. Thus, a secure wireless data connection is established between client device 28 and target server 32 via CMD 12.

As disclosed above, CMD 12 is configured to communicate with management system 26 to receive connectivity credentials for client devices 28. CMD 12 can be equipped with an enhanced software module configured to connect CMD 12 with management server 30, such as blockchain digital ledger or device management application server on the public Internet or a private network.

FIGS. 8 and 9 further depict an administrator 34 having access to management system 26. As disclosed above, by having access to management system 26, administrator 34 can remotely create and delete rules associating specific client devices 28 with specific CMDs 12. Administrator 34 can also remotely initialize and change the settings of CMDs 12.

Figure 10:
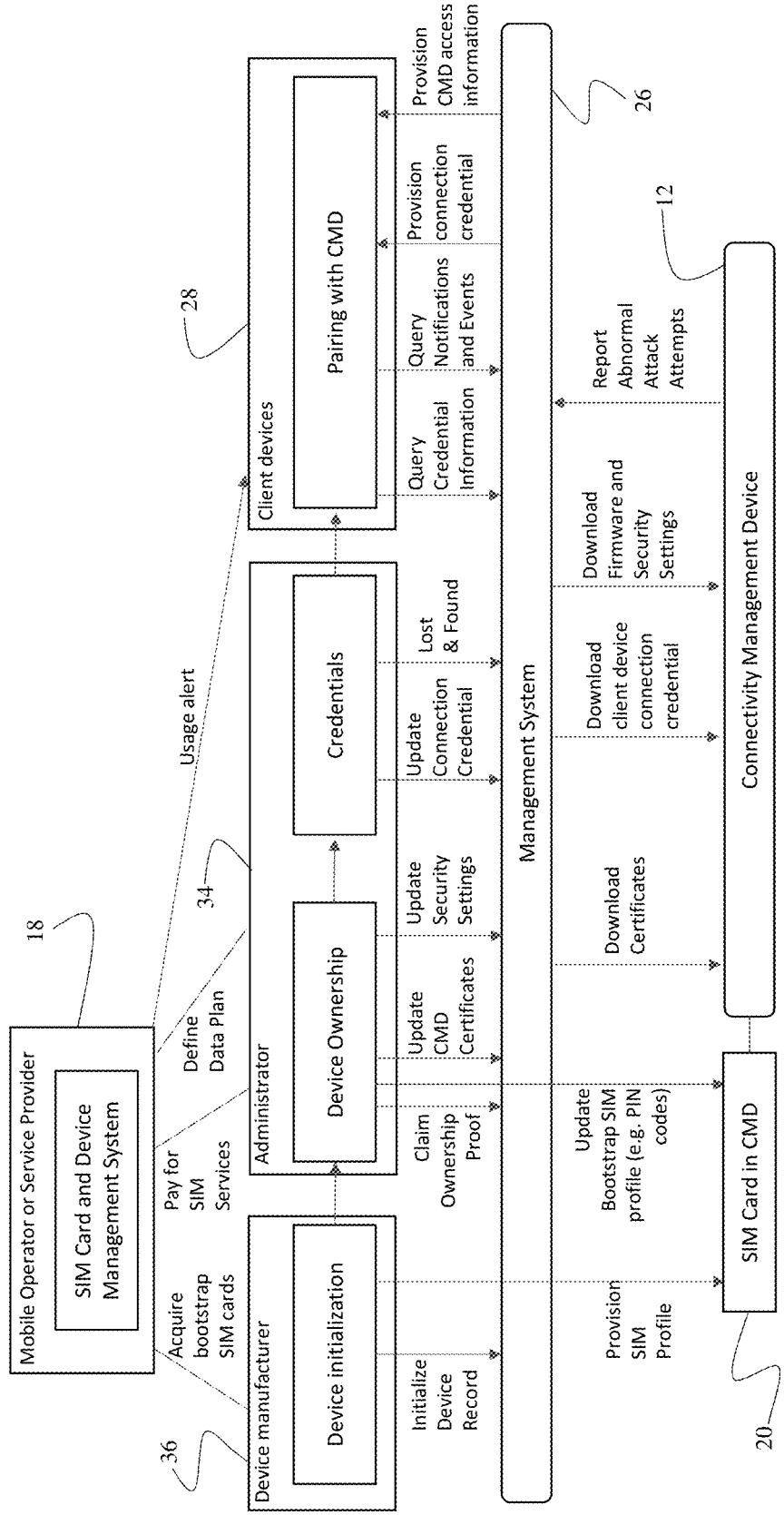
FIG. 10 is a block diagram depicting relationships between various components and entities of the system.

FIG. 10 depicts interrelationships between various components of the invention. Specifically, FIG. 10 depicts that manufacturer 36 provisions SIM profile onto SIM/eSIM module 20 during CMD 12 initialization process. Subsequently, administrator 34 updates SIM profile and PIN code for SIM/eSIM module 20.

Management system 26 is configured to store various records including CMD 12 initialization record from manufacturer 36. Management system 26 is further configured to store the following records from administrator 34: claim of CMD 12 ownership, CMD 12 certificates, security settings, connectivity credentials, and lost and found records. Management system 26 is configured to query client device 28 for credential information and notification and events. Management system 26 is also configured to provision connectivity credential and CMD 12 access information to client device 28. In an embodiment, management system 26 can in the form of blockchain network consisting of multiple nodes configured to record and maintain transaction records in a secure and immutable way, or in the form of multiple device management application servers hosted by a hosting company to provide secure communication with CMDs 12.

CMD 12 is configured to download certificates, connectivity credential for client device 28, and firmware and security setting from management system 26. CMD 12 is also configured to transmit security reports to management network 26. The disclosed system can further include an Authentication Server or Active Directory server for client device 28 and CMD 12 authentication. The system may further include an API Server configured to interface with an application in management system 26 and mobile network core elements. API server can be used to execute data plan control, short message notification, and device profile update. A Dynamic IMSI Server may be used to keep track of CMD 12 profile and dynamically update the profile based on predefined policies.

Management system 26 can be configured to trigger CMD 12 to automatically switch its international mobile subscriber identity (IMSI) based on location of CMD 12. Dynamic IMSI switching to use different subscriber ID in different networks can enable CMD 12 to connect to a local mobile network, thereby lowering global data access expense by avoiding roaming charges. This objective can be achieved by aggregating subscriber IDs from multiple operators into one platform. Data usage history can be tracked, and alerts can be issued if excessive data usage is detected.

The invention can also enable auto launch of secure connections to corporate VPN servers triggered by client device 28 or an application. This feature facilitates simplified user experience without compromising the security.

In an embodiment, management system 26 is used to manage CMDs 12 to achieve secure and zero touch provisioning. Connectivity credential of client device 28 can be automatically provisioned into a secure storage of CMD 12. Only Wi-Fi connections from certified corporate client devices 28 that are assigned to a specific user are allowed. The latest security policy can be updated from a remote server.

The invention can further improve the process of managing employee client devices 28. In an embodiment, IDs of client devices 28 are automatically associated with a specific CMD 12. Access information for the specific CMD 12 can be automatically provisioned into client devices 28. Client devices 28 can be restricted from connecting to Wi-Fi networks that are not corporate certified networks.

In an embodiment CMD 12 can be configured to connect to WAN, thereby allowing connecting to both mobile networks and Wi-Fi networks. Different security rules can be applied when connecting to different networks.

CMD 12 can be configured to enable multiple security features. The policy, certificate and corporate data can be securely stored into SIM/eSIM module 20 and/or TPM (Trusted Platform Module) inside CMD 12. CMD 12 can be authenticated into corporate authentication system based on a predefined key. In an embodiment, multi-factor authentication enables fingerprint authentication, authentication using SMS code, connectivity credential, certificate, etc.

In an embodiment, the invention has monitoring and detection features. For example, an alert can be transmitted to the employee's email or via SMS and a copy of the alert can be sent to the IT team. Embedded security firewall can be used to detect abnormal traffic, port scanning, and other threats. The invention can be further configured to detect and react to tamper attempts with respect to firmware and/or hardware to prevent misuse if CMD 12 is lost.

Figure 11:
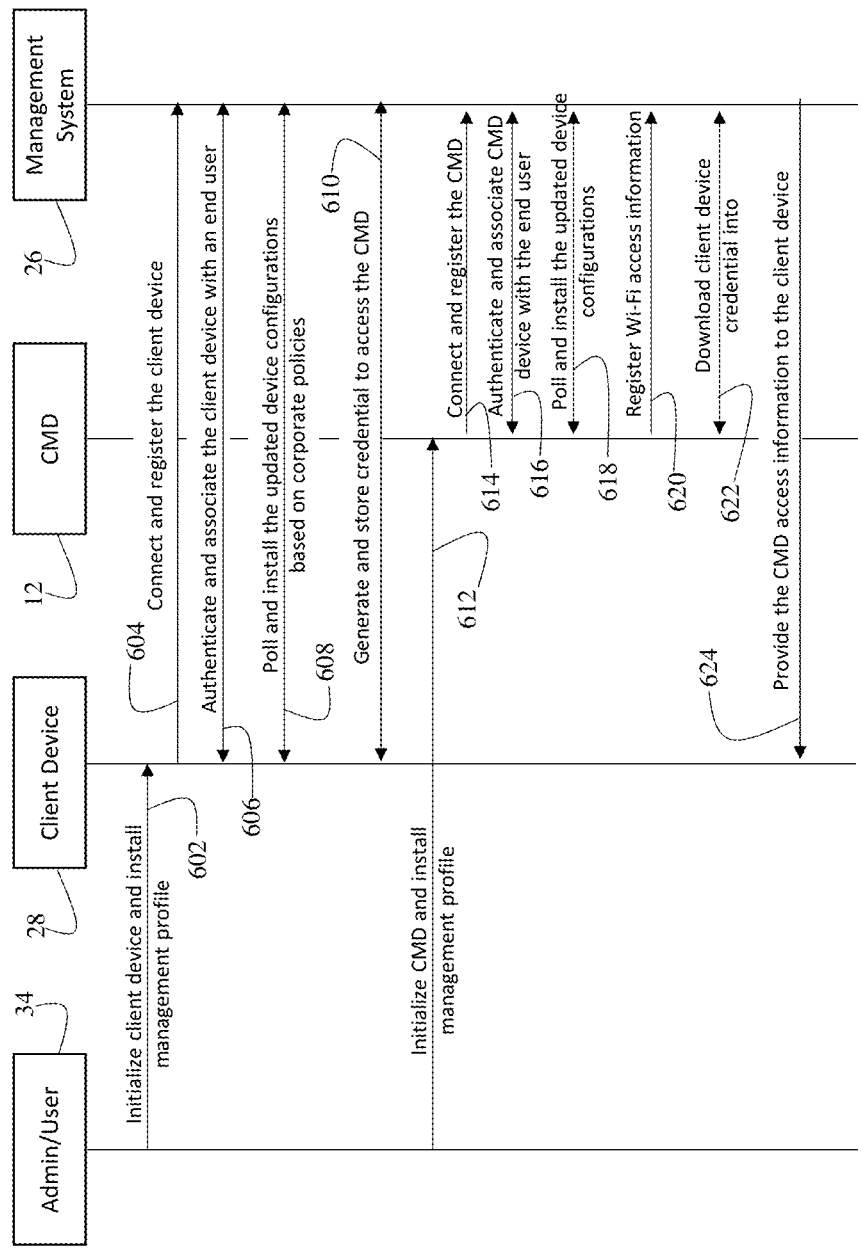
FIG. 11 is a signaling diagram depicting the processes of registration and credential provisioning.
Figure 12:
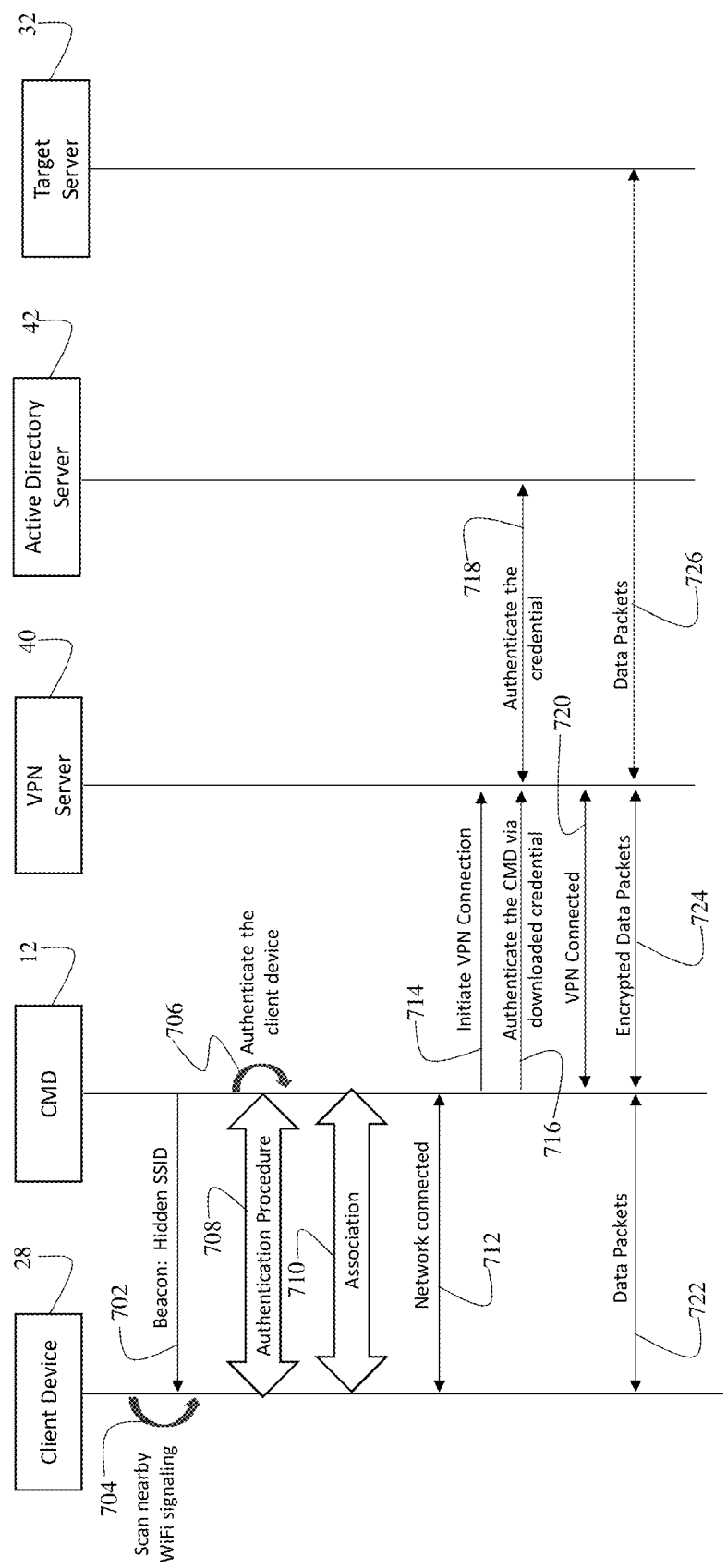
FIG. 12 is a signaling diagram depicting the process of device association and VPN connection.

FIGS. 11-12 provide signaling flow diagrams illustrating various aspects of the invention. FIG. 10 depicts the signaling flow for the initial provisioning process during which client device 28 registers with management system 26 and receives its connectivity credential and CMD 12 access information. FIG. 10 also depicts the process according to which management system 26 provisions connectivity credential for client device 28 to CMD 12, thus enabling CMD 12 to authenticate a pairing request from client device 28.

FIG. 11 depicts that, in step 602, administrator 34 enters a command initializing client device 28 and installing management profile. In step 604, client device 28 connects to and registers with management system 26. In step 606, management system 26 authenticates client device 28 and associates client device 28 with a particular end user. In step 608, client device 28 installs updated configurations. In step 610, generates a connectivity credential for enabling client device 28 to connect to CMD 12 and transmits the connectivity credential to client device 28.

Next, in step 612, administrator 34 enters a command initializing CMD 12 and installing management profile. In step 614, CMD 12 establishes a network connection with management system 26 and registers therewith. In step 616, management system 26 authenticates CMD 12 and associates CMD 12 with the end user. Because both CMD 12 and client device 28 are associated with the same end user, a rule can be established associating CMD 12 with client device 28.

In step 618, management system 26 directs CMD 12 to install undated configurations. In step 620, management system 26 registers Wi-Fi access information of CMD 12. In step 622, management system 26 provisions the connectivity credential for client device 28 to CMD 12. In step 624, management system 26 provisions access information of CMD 12 to client device 28, thereby enabling client device 28 to send a pairing request to CMD 12.

FIG. 12 depicts a method of using CMD 12 to establish a VPN connection between client device 28 and target server 32. In step 702, CMD 12 broadcasts a connection beacon, which can be a hidden service set identifier (SSID). In step 704, client device 28 scans for nearby Wi-Fi signaling based on the CMD 12 access information receiving from management system 26. In step 706, client device 28 and CMD 12 execute the authentication procedure, during which CMD 12 and client device 28 exchange authentication challenges based on the first connectivity credential and the second connectivity credential. In step 708, CMD 12 authenticates client device 28. In step 710, client device 28 and CMD 12 complete the association procedure. In step 712, network connection between client device 28 and CMD 12 is established.

Next, in step 714, CMD 12 can be configured to automatically initiates a network connection toward a VPN server 40 based on the connected client device 28 information. In step 716, VPN server 40 authenticates CMD 12 using a credential CMD 12 received from management system 26. The authentication procedure involves step 718, in which VPN server 40 authenticates the credential with an active directory server 42. If the authentication is successful, the method proceeds to step 720. In step 720, VPN connection between CMD 12 and VPN server 40 is established. Subsequently, data packets are transmitted between client device 28 and CMD 12 in step 722. The encrypted data packets are transmitted between CMD 12 and VPN server 40 in step 724. In step 726, data packets are transmitted between VPN server 40 and target server 32. In this manner, VPN connection is established between CMD 12 and VPN server 40 to provide secure data transportation tunnel between the client device 28 and target server 32.

Figure 13:
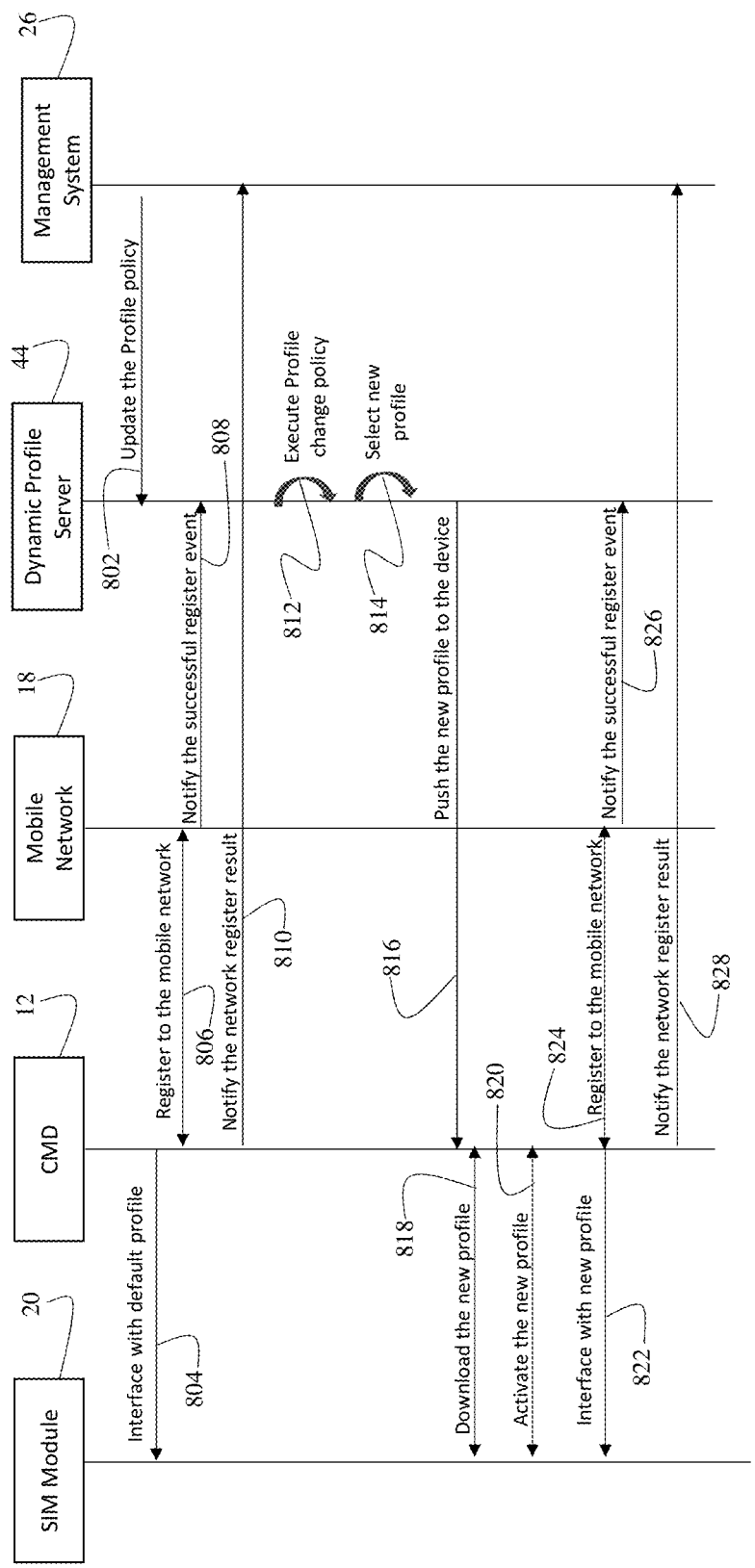
FIG. 13 is a signaling diagram depicting the process of dynamic SIM card profile switching.

FIG. 13 depicts a method of dynamic profile switching of SIM module 20 to enable CMD 12 to connect to a mobile network 18. This capability enables client device 28 to avoid roaming fees because CMD 12 is able to establish a non-roaming connection with a mobile network 18 using a profile associated with that mobile network. In step 802, management system 26 updates the profile policy to dynamic profile server 44. In step 804, CMD 12 interfaces with SIM module 20. In step 806, CMD 12 registers with mobile network 18. In step 808, mobile network 18 notifies dynamic profile server 44 of the successful registration event. In step 810, CMD 12 notifies management system 26 of a successful network registration result. In step 812, dynamic profile server 44 executes profile change policy based on the matched policy provisioned in step 802, and, in step 814, dynamic profile server 44 selects a new profile corresponding to mobile network 18.

In step 816, the selected profile is pushed to CMD 12. In step 818, SIM module 20 downloads the new profile. In step 820, CMD 12 communicates with SIM module 20 to activate the new profile. In step 822, CMD 12 interfaces with SIM module 20 using the new profile. In step 824, CMD 12 registers with mobile network 18. In step 826, mobile network 18 notifies dynamic profile server 44 of the successful registration event. In step 828, CMD 12 notifies management system 26 of the successful network registration result.

Figure 14:
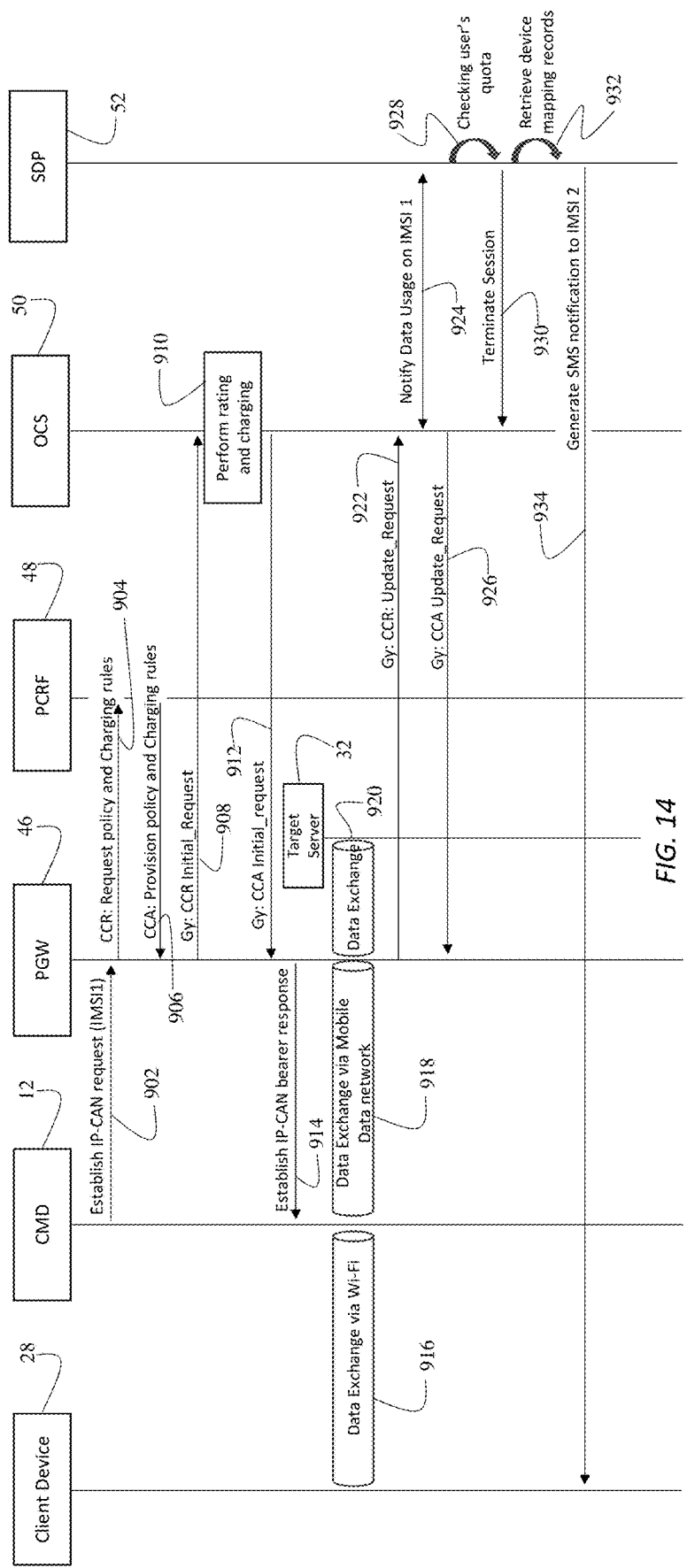
FIG. 14 is a signaling diagram depicting the process of monitoring usage and sending notifications related thereto.

FIG. 14 depicts a method for monitoring data usage and issuing notifications when excessive data usage is detected. In step 902, CMD 12 triggers the IP Connectivity Access Network (IP-CAN) bearer establish request to Packet Gateway (PGW) 46 with a first IMSI associated with CMD 12. In step 904, PGW 46 sends a Credit Control Request (CCR) to Policy and Charging Rules Function (PCRF) 48 requesting for policy and charging rules, and, in step 906, PCRF 48 responds with Credit Control Answer (CCA), thus provisioning policy and charging rules to PGW 46. In step 908, PGW 46 sends CCR initial request to Online Charging System (OCS) 50 over Gy interface. In step 910, OCS 50 performs rating and charging procedures and, in step 912, responds to PGW 46 with CCA initial request over Gy interface. In step 914, PGW 46 sends an establish IP-CAN bearer response. A person skilled in the Evolved Packet Core will understand that several network components are omitted from the diagram for simplicity purpose, the eNodeB, MME (Mobility Management Entity), SGW (Serving Gateway), the detail IP-CAN bearer establishment procedure can be further referred to 3GPP TS 29.274: "3GPP Evolved Packet System (EPS); Evolved General Packet Radio Service (GPRS) Tunnelling Protocol for Control plane (GTPv2-C); Stage 3".

In step 916, client device 28 exchanges data with CMD 12 via the Wi-Fi connection (the procedure for establishment of which is depicted in FIG. 12). In step 918, CMD 12 exchanges data with PGW 46 via the mobile data connection established via step 902 to step 914. Next, in step 920, PGW 46 exchanges data with target server 32. In this manner, a wireless data connection between client device 28 and target server 32 is established using CMD 12.

In step 922, PGW 46 sends a CCR update request to OCS 50 when the usage volume of the data exchanged between the CMD 12 and PGW 46 reaches the quota specified in the Step 912. In step 924, OCS 50 interrogates Service Data Point (SDP) 52 for data usage for IMSI associated with CMD 12. In step 926, OCS 52 responds to PGW 46 with a CCA update request. In step 928, SDP 52 checks user's quota. If the user's quote exceed a predefined threshold, SDP 52 can issue a command to OCS 50 to terminate the session in step 930. In step 932, SDP 52 retrieves the records mapping CMD 12 to client device 28. In step 934, SDP 52 sends a notification directly to an IMSI associated with client device 28. In this manner, user of client device 28 can receive a notification message detailing the data usage over the connection with CMD 12 and target server 32.

Exemplary Use Cases

Example 1. CMD 12 functions as a portable mobile hotspot using Wi-Fi tethering to connect multiple client devices 28 and apply security policy. A management system 26 is utilized to provide remote management of the client device's security policy.

Example 2. CMD 12 is an always connected personal computer (PC) with added Wi-Fi tethering feature. The always connected PC is equipped with eSIM function 20 that enables connection with mobile networks 18. The connected PC uses Wi-Fi tethering to connect multiple client devices 28 and apply security policy. A management system 26 is utilized to provide remote management of the client device's security policy.

Example 3. CMD 12 functions as an IoT gateway that supports multiple wireless technologies. The IoT Gateway uses Bluetooth, Zigbee, LoRa, or another wireless protocol to connect with multiple client devices 28. The IoT gateway also uses Wi-Fi or mobile data networks 18 to connect to target application servers 32. A management system 26 with secure data access is utilized to provide simple, zero touch provisioning function.

SOFTWARE AND HARDWARE EXAMPLES

The various techniques described herein can be implemented in connection with hardware or software or, where appropriate, with a combination of both. Thus, the methods and system described herein, or certain aspects or portions thereof, can take the form of program code (i.e., instructions) embodied in tangible media, such as hard drives, solid state drives, or any other machine-readable storage medium, wherein, when the program code is loaded into and executed by a machine, such as a computing device, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The invention can also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the invention. Additionally, any storage techniques used in connection with the invention can be a combination of hardware and software.

The advantages set forth above, and those made apparent from the foregoing disclosure, are efficiently attained. Since certain changes may be made in the above construction without departing from the scope of the invention, it is intended that all matters contained in the foregoing disclosure or shown in the accompanying drawings shall be interpreted as illustrative and not in a limiting sense.

What is claimed is:

1. A method of establishing a wireless data connection between a client device and a target server, comprising:
    establishing a first network connection between a connection management device (CMD) and a management system;
    registering the CMD as a record into the management system;
    establishing a second network connection between the client device and the management system;
    retrieving, by the management system, a unique identifier associated with the client device;
    establishing, in the management system, a rule associating the client device with the CMD;
    triggering, by the management system, provisioning of a first connectivity credential to the CMD;
    triggering, by the management system, provisioning of a second connectivity credential and access information associated with the CMD to the client device;
    receiving, by the CMD, a pairing request from the client device, wherein the client device transmits the pairing request based on the access information provisioned to the client device;
    authenticating the client device, by the CMD, by exchanging authentication challenges based on the first connectivity credential the CMD received from the management system and the second connectivity credential the client device received from the management system;

responsive to a successful authentication of the client device, establishing a third network connection, between the client device and the CMD, wherein a first transceiver housed within the CMD is used to establish the third network connection;

establishing a fourth network connection, between the CMD and the target server, wherein the fourth network connection is established using a second transceiver housed within the CMD; and establishing the wireless data connection between the client device and the target server, wherein data packets are transferred between the client device and the CMD via the third network connection and transferred between the CMD and the target server via the fourth network connection.

2. The method of claim 1, wherein the first connectivity credential provisioned to the CMD is encrypted and is configured to be decrypted with a private key associated with the CMD.

3. The method of claim 1, wherein the second connectivity credential provisioned to the client device is encrypted and is configured to be decrypted with a private key associated with the client device.

4. The method of claim 1, wherein the step of establishing the fourth network connection between the CMD and the target server comprises setting up data connection between the CMD and a security gateway.

5. The method of claim 4, wherein the CMD is configured to encapsulate the data packets received from the client based on a protocol specified by the security gateway prior to transmitting encapsulated data packets to the security gateway.

6. The method of claim 4, wherein the CMD is configured to decapsulate the data packets received from the security gateway and to relay decapsulated data packets to the client device.

7. The method of claim 1, wherein the management system is a blockchain digital ledger network or a device management system reachable via public Internet or private connections.

8. The method of claim 1, wherein the fourth network connection between the CMD and the target server is established over a Global System for Mobile Communications (GSM) network, a Universal Mobile Telecommunications Service (UMTS) network, a Long-Term Evolution (LTE) network, or a $5^{th}$ Generation (5G) network.

9. The method of claim 8, wherein the fourth network connection is established based on an international mobile subscriber identity (IMSI) incorporated into a subscriber identification module (SIM) card, a USIM card, an Embedded Universal Integrated Circuit Card (eUICC) card, or a virtual SIM card.

10. The method of claim 1, wherein the third network connection between the client device and the CMD is established over a wireless communication technology selected from the group consisting of a Wireless Fidelity (Wi-Fi), a Zigbee, a Long Range (LoRa), and a Bluetooth technology.

11. The method of claim 1, wherein the first connectivity credential comprises an identifier, an authentication type, an authentication credential, and a public key of the client device.

12. The method of claim 1, wherein the second connectivity credential comprises an identifier, a radio beacon type, an authentication type, an authentication credential, and a public key of the CMD.

13. The method of claim 1, wherein the client device is managed by a Mobile Device Management (MDM) system, and wherein the management system triggers the MDM to provision the second connectivity credential to the client device.

14. A method of establishing a wireless data connection between a client device and a target server, comprising:
    connecting a connection management device (CMD) and a management system over a mobile network;
    registering the CMD as a record into the management system;
    connecting the client device to the management system;
    retrieving, by the management system, a unique identifier associated with the client device;
    establishing, in the management system, a rule associating the client device with the CMD;
    generating, by the management system, a first connectivity credential and the second connectivity credential;
    retrieving, by the CMD, the first connectivity credential from the management system;
    provisioning to the client device the second connectivity credential and access information associated with the CMD;
    receiving, by the CMD, a pairing request from the client device, the pairing request based on the access information provisioned to the client device;
    authenticating the client device, by the CMD, by exchanging authentication challenges based on the first connectivity credential and the second connectivity credential;
    responsive to a successful authentication of the client device, connecting the client device and the CMD over a first wireless technology using a first transceiver housed within the CMD;
    connecting the CMD and the target server over the mobile network using a second transceiver housed within the CMD; and
    establishing the wireless data connection between the client device and the target server, wherein data packets are transferred between the client device and the CMD via the first wireless technology connection and transferred between the CMD and the target server via the mobile network connection.

15. The method of claim 14, wherein the first and the second connectivity credentials are encrypted, and wherein the first connectivity credential is configured to be decrypted using a private key associated with the CMD and the second connectivity credential is configured to be decrypted using a private key associated with the client device.

16. The method of claim 14, wherein the management system is a blockchain digital ledger network or a device management system reachable via public Internet or private connections.

17. The method of claim 14, wherein the mobile network is selected from a group consisting of a Global System for Mobile Communications (GSM) network, a Universal Mobile Telecommunications Service (UMTS) network, a Long-Term Evolution (LTE) network, and a $5^{th}$ Generation (5G) network.

18. The method of claim 14, wherein the first wireless network technology selected from the group consisting of a Wireless Fidelity (Wi-Fi), a Zigbee, a Long Range (LoRa), and a Bluetooth technology.

19. The method of claim 14, wherein the first connectivity credential comprises an identifier, an authentication type, an authentication credential, and a public key of the client device.

20. The method of claim 14, wherein the second connectivity credential comprises an identifier, a radio beacon type, an authentication type, an authentication credential, and a public key of the CMD.

\* \* \* \* \*